United States Patent [19]

Pecore

[11] Patent Number: 5,860,028

[45] Date of Patent: Jan. 12, 1999

[54] I/O BUS EXPANSION SYSTEM WHEREIN PROCESSOR CHECKS PLURALITY OF POSSIBLE ADDRESS UNTIL A RESPONSE FROM THE PERIPHERAL SELECTED BY ADDRESS DECODER USING USER INPUT

[75] Inventor: Rick Alan Pecore, Manitowoc, Wis.

[73] Assignee: Paragon Electric Company, Inc., Two Rivers, Wis.

[21] Appl. No.: 595,383

[22] Filed: Feb. 1, 1996

[51] Int. Cl.⁶ .............................. G06F 13/14; G06F 13/22
[52] U.S. Cl. ...................... 395/861; 395/822; 395/830; 395/837; 395/866
[58] Field of Search ...................................... 395/821, 822, 395/823, 857, 824, 829, 835, 830, 837, 861, 866

[56] References Cited

U.S. PATENT DOCUMENTS

| | | | |
|---|---|---|---|
| 4,315,308 | 2/1982 | Jackson | 364/200 |
| 4,628,480 | 12/1986 | Floyd | 364/900 |
| 5,359,717 | 10/1994 | Bowles et al. | 395/325 |

*Primary Examiner*—Thomas C. Lee
*Assistant Examiner*—Ki S. Kim
*Attorney, Agent, or Firm*—Foley & Lardner

[57] ABSTRACT

A processing system including a processor and a peripheral wherein a configuration input of an address decoder or a device address input of a peripheral device which is not needed to set the peripheral's device address is used to increase the input capability of the processor. A data input signal is coupled to the configuration input or to the device address input such that the peripheral has a plurality of possible device addresses dependent on the state of the data input signal. The processor is configured to attempt communication with the peripheral by checking the plurality of possible device addresses of the peripheral until the peripheral gives a response to the processor. The device address to which the peripheral responds represents the state of the data input signal.

26 Claims, 2 Drawing Sheets

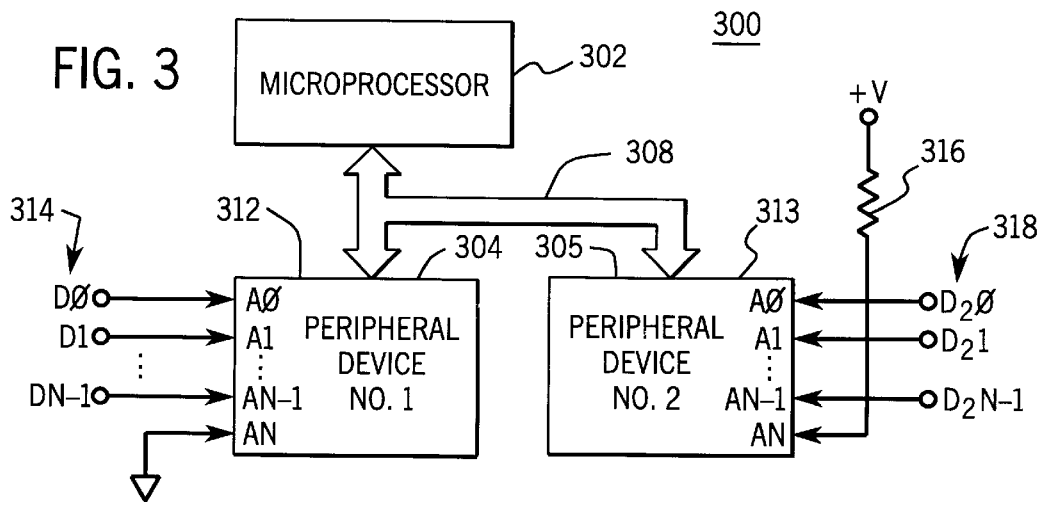
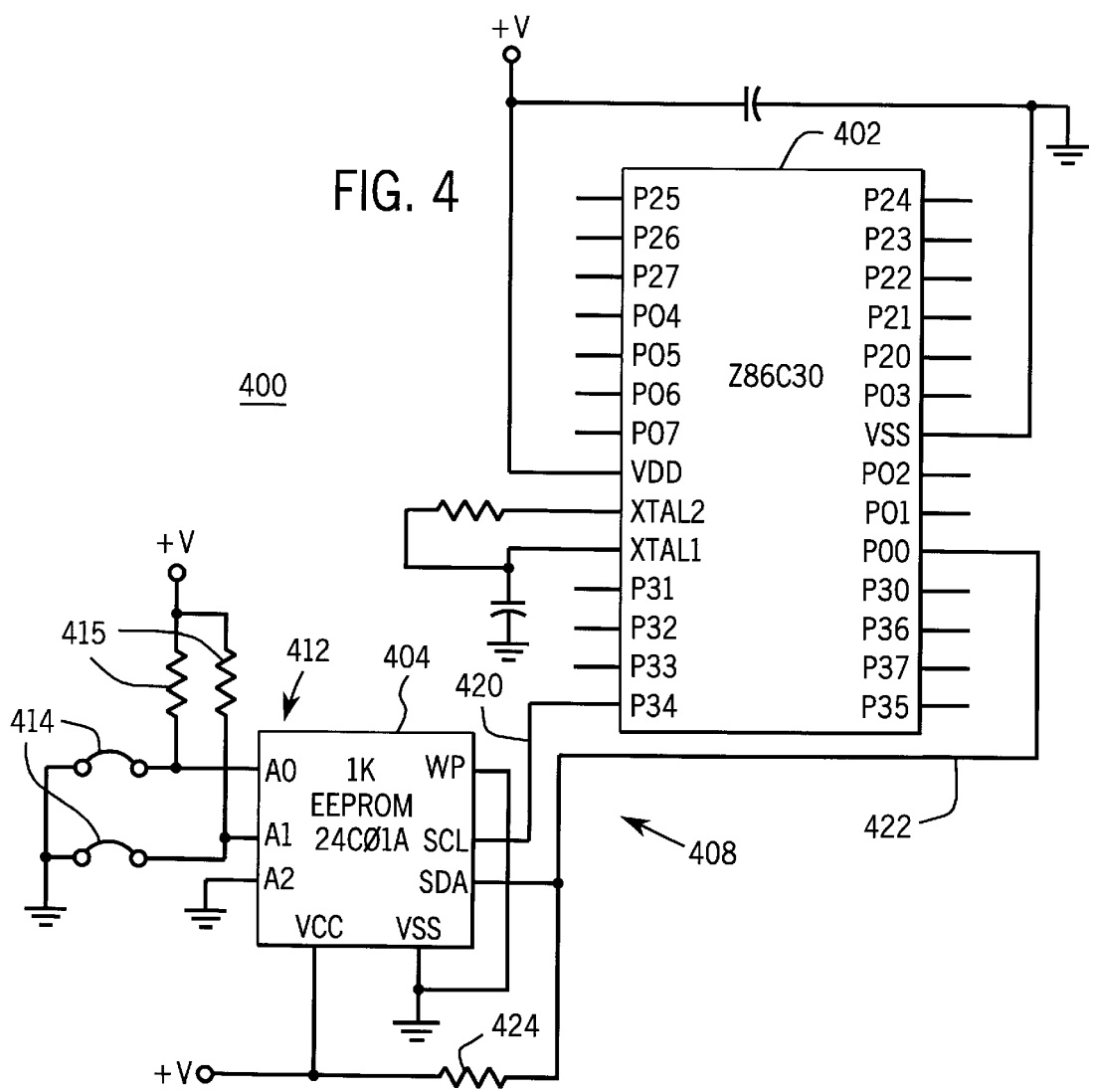

I/O BUS EXPANSION SYSTEM WHEREIN PROCESSOR CHECKS PLURALITY OF POSSIBLE ADDRESS UNTIL A RESPONSE FROM THE PERIPHERAL SELECTED BY ADDRESS DECODER USING USER INPUT

FIELD OF THE INVENTION

The invention relates to expanding the input capability of a processing system. In particular, the invention relates to a processing system including a processor and a peripheral wherein address inputs not needed to set the peripheral's address are used to increase the input capability of the processor.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

Microprocessor-based circuits are used in a large variety of applications to perform many different functions. For example, a microprocessor-based circuit can be used as a central processing unit in a computer or as a dedicated controller for a computer's input/output circuitry. An embedded microprocessor-based circuit can be used to control the operation of an appliance such as a water softener, refrigerator or microwave oven. Other applications of these versatile circuits will be apparent to a person of skill in the art.

Microprocessor-based circuits interface with "realworld" and internal system signals using input and output pins. Pins may be provided on the microprocessor itself, or on interface circuits in communication with the microprocessor. For example, a Z86C30 microprocessor provides 24 pins dedicated to input and output functions. However, as advances in integrated circuit design have made it possible to control more signal lines within a chip, the number of available input and output pins on integrated circuit packages has become a limitation on the design of microprocessor-based circuits. The pins available can determine the type of microprocessor that can be used for a given application and the number of interface circuits which must be provided, thereby affecting the number of features the circuit can provide as well as product cost.

Microprocessor-based circuits commonly include peripherals which provide communication and auxiliary functions (e.g., display drivers, interfaces, memories, A/D converters). A microprocessor typically communicates with peripherals over a multi-wire parallel or serial bus which may accommodate several peripherals. If only one peripheral is on a bus, a microprocessor can communicate with the peripheral with no ambiguity. However, if more than one peripheral is on a bus, the circuit must be designed to allow a microprocessor to unambiguously address a particular peripheral.

Several designs enable a microprocessor to address a particular peripheral over a bus. In one design, each peripheral on a bus is assigned a unique address. To communicate with a particular peripheral, the microprocessor specifies the peripheral's unique device address. An address decode circuit uses the unique device address to generate a signal to select or enable the desired peripheral. The selected peripheral can then communicate with the microprocessor. In addition, an address decode circuit may include configuration inputs which selectively change the device address of a particular peripheral. For example, configuration inputs could be used to change the device address of a memory device. The address decode circuit could use the configuration inputs to generate appropriate select signals to the memory device.

In another design, such as that of the "I$^2$C" bus (a standard serial interface used by a family of devices sold by companies such as Philips, Signetics, Exel and Microchip Technology), each peripheral type is assigned a unique device code (e.g., the unique device code of a non-volatile memory is $1010_2$). The pre-assigned device code is built into each peripheral and cannot be changed. To initiate communication with a peripheral on a bus with only a single peripheral of that type, a microprocessor specifies the peripheral's unique device code and only the desired peripheral will respond. However, to accommodate a bus with several peripherals of the same type, peripherals have several device address inputs which can be set by hardware to logic high or low (e.g., the 24C01A EEPROM has three device address inputs). The microprocessor initiates communication with a peripheral by specifying an address in addition to the device code and only the desired peripheral will respond.

It is possible for a microprocessor-based circuit to operate regardless of the state of configuration inputs which selectively change the device address of a particular peripheral, or for the circuit to use only one peripheral of a given type. For example, a circuit may allow a memory device to be accessed at different device addresses, or the circuit may use only a single EEPROM device. In these cases, the configuration inputs or device address inputs can be set to any state provided the microprocessor is programmed to access the peripheral at the correct device address. In this respect, the configuration inputs and device address inputs have no functional purpose in the circuit.

Accordingly, it would be desirable to provide a processing system wherein configuration inputs and device address inputs not needed to set a configuration or a peripheral's device address are used to increase the input capability of a processor. It would also be desirable to provide a processing system wherein the configuration inputs to an address decoder or device address inputs to a peripheral device can be set to a logic high or low through the use of a switch, jumper wire, dual in-line package (DIP) switch, etc. and read by a microprocessor.

SUMMARY OF THE INVENTION

In one embodiment, the invention relates to a processing system for reading at least one data input, each data input having at least two states. The processing system includes a peripheral and an address decoder coupled to the peripheral, the address decoder having an address input and at least one configuration input coupled to the at least one data input. The address decoder is configured to select the peripheral based upon the address input and the configuration inputs, whereby the peripheral has a plurality of possible device addresses dependent on the state of each data input. The invention also includes a processor coupled to the peripheral and to the address input of the address decoder. The processor is configured to attempt communication with the peripheral by checking the plurality of possible device addresses of the peripheral until the address decoder selects the peripheral and the peripheral gives a response to the processor, whereby the device address to which the peripheral responds represents the state of each data input.

In another embodiment, the invention relates to a processing system including a peripheral device having at least one device address input, whereby the peripheral device has a plurality of possible addresses dependent on each device address input. At least one data input is coupled to the at least one device address input of the peripheral device, and each data input has two states whereby the device address of the peripheral device is at least partially based upon the state of each data input. The invention also includes a microprocessor coupled to the peripheral device. The microprocessor is configured to attempt communication with the peripheral device by checking the plurality of possible device addresses of the peripheral device until the peripheral device gives a response to the microprocessor, whereby the device address to which the peripheral device responds represents the state of each data input.

In still another embodiment, the invention relates to a method for expanding the input capability of a microprocessor system including a peripheral device having at least one device address input and at least one data input coupled to the at least one device address input of the peripheral device. Each data input has two states whereby the address of the peripheral device is at least partially based upon the state of each data input. The system of the invention also includes a microprocessor coupled to the peripheral device. The method includes the steps of (a) attempting to communicate with the peripheral device by using one possible device address of the peripheral device; (b) repeating step (a) using different possible device addresses of the peripheral device until the peripheral device responds to the microprocessor; and (c) using the device address to which the peripheral device responds to determine the state of each data input.

In a further embodiment, the invention relates to a processing system for reading at least one data input signal, each data input signal having at least two states. The processing system includes a peripheral device having device address input means whereby the peripheral device has a plurality of possible addresses dependent on the device address input, and at least one data input means coupled to the device address input means of the peripheral device, the data input means being representative of the data input signal, whereby the device address of the peripheral device is at least partially based upon the state of each data input signal. The invention also includes a microprocessor coupled to the peripheral device. The microprocessor is configured to attempt communication with the peripheral device by checking the plurality of possible device addresses of the peripheral device until the peripheral device gives a response to the microprocessor, whereby the device address to which the peripheral device responds represents the state of each data input signal.

BRIEF DESCRIPTION OF THE DRAWINGS

The invention will become more fully understood from the following detailed description, taken in conjunction with the accompanying drawings, wherein like reference numerals refer like parts, in which:

FIG. 3 is a view similar to FIG. 2, but showing two peripheral devices of the same type wherein the device address inputs of the peripherals are used both to set the peripheral's device addresses and to input data.

FIG. 4 is an electrical schematic diagram of a circuit wherein otherwise unused device address inputs are used to increase the input capability of a processing system.

DETAILED DESCRIPTION OF THE PREFERRED EMBODIMENT

Figure 1:
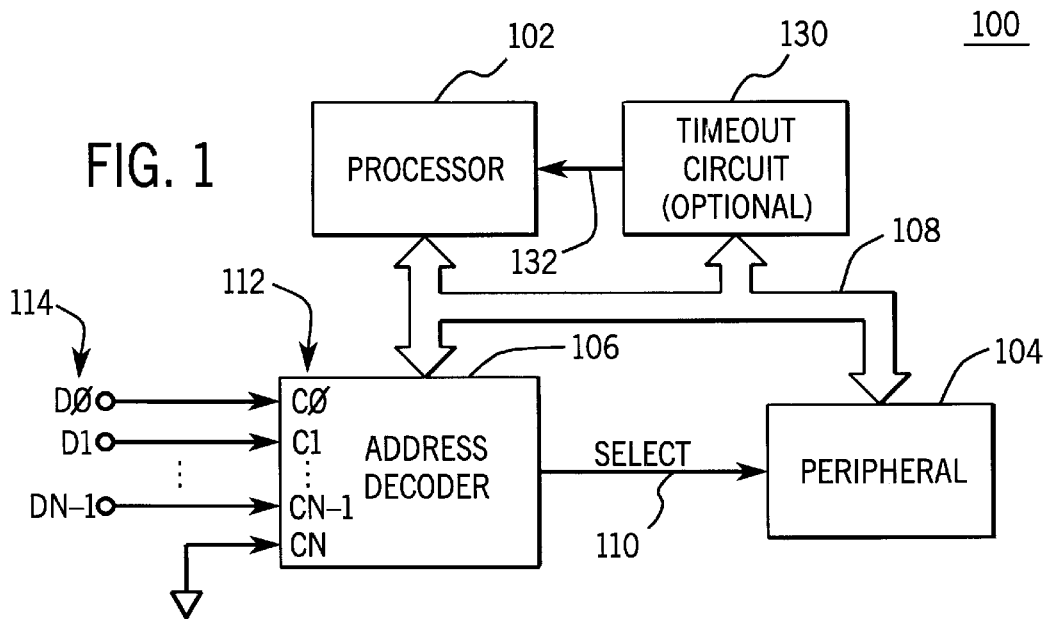
FIG. 1 is a block diagram of a processing system including a peripheral, an address decoder and a processor wherein configuration inputs not needed to set the peripheral's device address are used to increase the input capability of the processor.

Referring to FIG. 1, a processing system 100 includes a processor 102, a peripheral 104 and an address decoder 106 coupled via a communication bus 108. Address decoder 106 is also coupled to peripheral 104 via a selection signal bus 110. Processor 102 is typically a microprocessor or microcontroller which controls the operation of processing system 100. Peripheral 104 often performs communication or auxiliary functions under the control of processor 102. By way of example, peripheral 104 may be a display driver, interface, or memory. Address decoder 106 generates selection signal 110 when an address signal on bus 108 matches the device address of peripheral 104. Address decoder 106 may be implemented on a separate integrated circuit from peripheral 104, or may be integral with peripheral 104 on the same integrated circuit.

Bus 108 is typically a multi-conductor (e.g., multi-wire or multi-fiber optic) parallel or serial bus which carries address, data and control information. Bus 108 may include a number of conductors for transmitting individual address, data and control signals (e.g., a parallel bus), or may include fewer conductors for transmitting multiplexed bus signals (e.g., a serial bus). In addition, processor 102, peripheral 104 and address decoder 106 may each be coupled to all or only some of the conductors of bus 108. By way of example, if a parallel bus 108 is used, address decoder 106 may not need to be coupled to the data lines of bus 108.

In operation, processor 102 communicates with peripheral 104 by applying an address signal to bus 108. Address decoder 106 compares the address on bus 108 to the device address of peripheral 104 and selects peripheral 104 using selection signal 110 when the addresses match, as discussed in further detail below. When selected, peripheral 104 gives a response to processor 102 via bus 108. Address decoder 106 may select peripheral 104 based upon part or all of the address asserted by processor 102 on bus 108. For example, address decoder 106 may perform a comparison using only a few higher-order address lines.

In a preferred embodiment, processor 102 is a Zilog Z86C30 microcontroller, peripheral 104 is an Exel 24C01A 1 K EEPROM, address decoder 106 is a decode circuit internal to the EEPROM, and bus 108 is an "$I_2C$" bus. As explained in the background, the Z86C30 processor 102 initiates communication with the 24C01A peripheral 104 by specifying a device address in addition to an "$I^2C$" unique device code.

Address decoder 106 includes at least one configuration input 112 for determining the device address of peripheral 104. Configuration inputs 112 are typically input using discrete pins. FIG. 1 shows an address decoder 106 with N configuration inputs 112 designated as C0, C1, . . . , CN. At least one configuration input 112 is coupled to at least one data input 114. FIG. 1 shows N-1 data inputs 114 designated as D0, D1, . . . , DN-1. The number of data inputs 114 depends on system requirements and need not equal the number of configuration inputs 112. For example, FIG. 1 shows the Nth configuration input CN grounded since the system has no need for an Nth data input. Data inputs 114 have at least two states and may be implemented as switches (e.g., DIP switches, jumper wires) which generate a logic high and a logic low. However, data inputs 114 may also be implemented by other circuits capable of generating a signal having at least two states, and the signal may change during operation of processing system 100. Since address decoder 106 selects peripheral 104 based upon the address on bus 108 and the state of configuration inputs 112, and data inputs 114 are coupled to configuration inputs 112, peripheral 104 has a plurality of possible device addresses that depend upon the state of data inputs 114.

In order to read the state of data inputs 114, processor 102 attempts to communicate with peripheral 104 by applying a possible device address of peripheral 104 to bus 108. Address decoder 106 compares the possible device address on bus 108 with the device address of peripheral 104 selected by data inputs 114. If the addresses do not match, address decoder 106 does not select peripheral 104, and peripheral 104 gives no response to processor 102. Processor 102 then re-attempts communication with peripheral 104 by applying a different possible device address of peripheral 104 to bus 108. This process continues until processor 102 applies the possible device address of peripheral 104 which matches the device address of peripheral 104. When the addresses match, address decoder 106 selects peripheral 104, and peripheral 104 gives a response to processor 102. The device address to which peripheral 104 responds represents the state of each data input 114.

If peripheral 104 is momentarily busy, it may fail to respond when processor 102 checks the correct possible device address of peripheral 104. To account for this situation, processor 102 can be configured to continue to attempt communication with peripheral 104 by repeating the check of the possible device addresses of peripheral 104 until peripheral 104 responds. Once peripheral 104 responds, the possible device address matches the device address of peripheral 104 and can be used to determine the state of each data input 114.

Processor 102 can be configured to determine the device address of peripheral 104, and therefore the state of data inputs 114, once at the beginning of operation. The correct device address could be stored in memory for later use. Processor 102 could also be configured to determine the device address of peripheral 104, and therefore the state of data inputs 114, throughout the operation of processing system 100. This configuration would allow processor 102 to read the state of data inputs 114 as they change over time.

If the protocol of bus 108 requires processor 102 to receive an acknowledge to each communication attempt before it can continue executing instructions, processing system 100 can include a timeout circuit 130 to generate a timeout signal 132 after a predetermined time period if no acknowledge is received. Processor 102 could use the timeout signal 132 to complete the current communication attempt and transmit the next possible address of peripheral 104.

Processing system 100 can use the expanded input capability which results from the above-described addressing arrangement for any purpose. For example, unused data inputs 114 could be used to read a jumper wire indicating whether power line frequency is 50 or 60 Hz, or whether a processing system should display data to a user in English or metric units.

Figure 2:
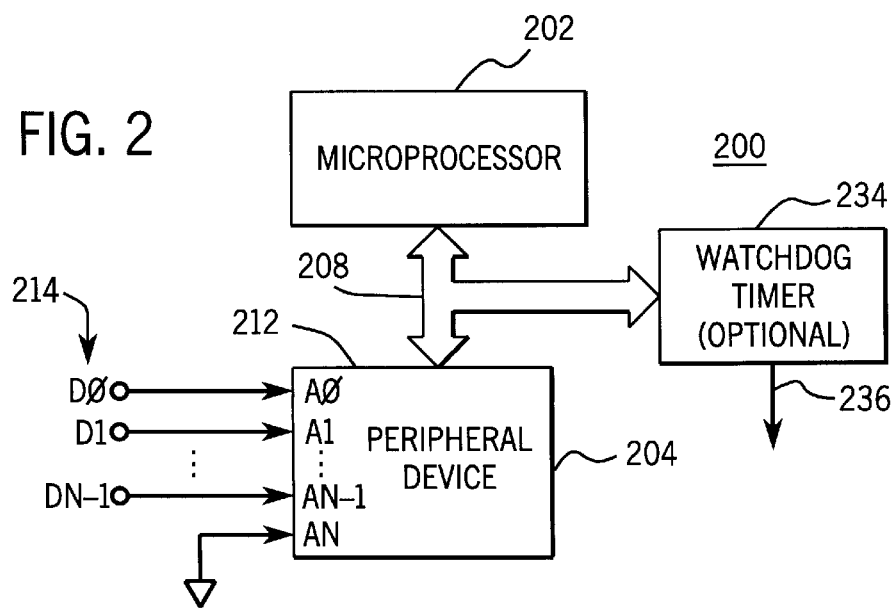
FIG. 2 is a block diagram of a processing system including a peripheral device and a microprocessor wherein device address inputs not needed to set the peripheral's device address are used to increase the input capability of the microprocessor.

FIG. 2 shows a processing system 200 with expanded input capability in accordance with a second embodiment. Processing system 200 includes a microprocessor 202 and a peripheral device 204 coupled via a communication bus 208. Microprocessor 202, peripheral device 204 and bus 208 are used in place of processor 102, peripheral 104 and bus 108, respectively, of FIG. 1. Peripheral device 204 is typically packaged in a discrete integrated circuit.

In operation, microprocessor 202 initiates communication with peripheral device 204 by asserting a device address on bus 208. Peripheral device 204 compares the device address on bus 208 to its own device address and gives a response to microprocessor 202 via bus 208 when the addresses match. Peripheral device 204 may respond based upon part or all of the device address asserted by microprocessor 202.

Peripheral device 204 includes at least one device address input 212 for determining the device address of peripheral device 204. Device address inputs 212 are typically input using discrete pins, and the term "device address inputs" includes any inputs used to select or enable the device based on a device address (e.g., device address inputs 212 could be chip select or chip enable inputs). FIG. 2 shows a peripheral device 204 with N device address inputs 212 designated as A0, A1, . . . , AN. At least one device address input 212 is coupled to at least one data input 214. FIG. 2 shows N-1 data inputs 214 designated as D0, D1, . . . , DN-1. The number of data inputs 214 depends on system requirements and need not equal the number of device address inputs 212. For example, FIG. 2 shows the Nth device address input AN grounded since the system has no need for an Nth data input. Data inputs 214 are similar to data inputs 114 of FIG. 1. Since device address inputs 212 select the device address of peripheral device 204, and data inputs 214 are coupled to device address inputs 212, peripheral device 204 has a plurality of possible device addresses that depend upon the state of data inputs 214.

In order to read the state of data inputs 214, microprocessor 202 attempts to communicate with peripheral device 204 by applying a possible device address of peripheral device 204 to bus 208. Peripheral device 204 compares the possible address with its own device address selected by data inputs 214. If the addresses do not match, peripheral device 204 gives no response to microprocessor 202. Microprocessor 202 then re-attempts communication with peripheral device 204 by applying a different possible device address of peripheral device 204 to bus 208. This process continues until microprocessor 202 applies the possible device address of peripheral device 204 which matches the device address of peripheral device 204 and peripheral device 204 responds. The device address to which peripheral device 204 responds represents the state of each data input 214.

Processing system 200 could also include a watchdog timer 234 to generate a command 236 to failsafe outputs (not shown) of processing system 200 if microprocessor 202 locks up on an infinite loop and is unable to update watchdog timer 234.

The present arrangement may also be used in a processing system including more than one peripheral device. Referring to FIG. 3, a processing system 300 includes a microprocessor 302, a first peripheral device 304 and a second peripheral device 305 coupled via a communication bus 308. For clarity, FIG. 3 is described using an example wherein peripheral devices 304 and 305 are "I²C" devices of the same type (e.g., both are 24C01A 1 K EEPROMs) and bus 308 is an "I²C" serial interface. Since peripheral devices 304 and 305 are the same type, microprocessor 302 cannot unambiguously address each peripheral device using the "I²C" unique device code. Thus, at least one device address input of each peripheral device is needed to distinguish the device address of peripheral device 304 from the device address of peripheral device 305. The AN device address input 312 of peripheral device 304 is connected to ground while the AN device address input 313 of peripheral device 305 is pulled high through pull-up resistor 316. The device address inputs AN of peripheral devices 304 and 305 together with the unique device code are sufficient to allow microprocessor 302 to unambiguously address the two peripheral devices. Since device address inputs A0, A1, . . . , AN-1 of each peripheral device 304 and 305 are not required for addressing, they are available for data inputs D0, D1, . . . , DN-1 (314) and $D_2 0$, $D_2 1$, . . . , $D_2 N\text{-}1$ (318) by processing system 300.

The operation of FIG. 3 is similar to the operation of FIG. 2, except that each possible device address of peripheral device 304 is an address corresponding to the AN device address input 312 in the grounded state, and each possible device address of peripheral device 305 is an address corresponding to the AN device address input 313 in the pulled up state. If there are $2^N$ peripheral devices of the same type coupled to bus 308, all N device address inputs will be needed to set the address of the peripheral devices and no device address inputs will be available for data input.

Referring to FIG. 4, an electrical schematic diagram of a circuit 400 using the present addressing arrangement includes a microprocessor 402 and a peripheral device 404 coupled via a communication bus 408. Microprocessor 402 is a Zilog Z86C30, peripheral device 404 is a 24C01A 1 K EEPROM and bus 408 is an "I²C" serial interface. Bus 408 includes a clock line 420 and a data line 422. Clock line 420 is driven by the P34 output of microprocessor 402 under software control. Data line 422 is a bidirectional line coupling the POO input/output of microprocessor 402 and the data line of peripheral device 404. Data line 422 is an open-drain signal coupled to a pull-up resistor 424 which allows data line 422 to be wire-ORed with other open-drain or open-collector outputs. By way of example, data line 422 and clock line 420 could be connected to the data and clock lines of another "I²C" device to expand the circuit.

Peripheral device 404 includes three device address inputs 412 designated A0, A1 and A2. Since the circuit includes only one peripheral device 404, a unique device code is sufficient to allow microprocessor 402 to unambiguously address peripheral device 404 and make device address inputs A0, A1 and A2 available for data input by circuit 400. However, as shown, microprocessor 402 can read only two data inputs 414 since device address input A2 is tied to ground. Device address inputs A0 and A1 are coupled to jumper wires 414. If a jumper wire 414 is present, the device address input is tied low. If a jumper wire 414 is absent, the device address input is pulled high by pull-up resistors 415. The meaning assigned to the presence or absence of each jumper wire 414 is determined by the user.

Microprocessor 402 asserts a command byte containing three components to initiate communication with peripheral device 404. The four most-significant bits are the unique device code (e.g., $1010_2$ for a non-volatile memory such as the 24C01A EEPROM). The next three bits are device address bits which peripheral device 404 compares to the device address inputs 412. The least significant bit is a write/read bit.

After asserting a command byte, microprocessor 402 waits for an acknowledge from peripheral device 404. Peripheral device 404, however, may not respond with an acknowledge for several reasons. First, no acknowledge is given unless both the unique device code and device address match that of peripheral device 404. Second, no acknowledge is given if the device is busy (e.g., EEPROM devices typically experience busy times on the order of milliseconds following a write cycle to the device). Third, either peripheral device 404 or the circuit itself has experienced a failure (e.g., an open-circuited trace).

To accommodate these situations, microprocessor 402 is configured to re-attempt communication with peripheral device 404 using a different possible device address, and to continue to attempt communication with peripheral device 404 in an infinite loop, until peripheral device 404 gives an acknowledge. The failure situation is accommodated since microprocessor 402 will lock up in an infinite loop until the failure disappears and peripheral device 404 responds. The processing system could also include a watchdog timer to generate a command to failsafe all outputs if microprocessor 402 locks up in the infinite loop and is unable to update the watchdog. Microprocessor 402 could also be configured to attempt communication for only a predetermined time period before setting a diagnostic error flag.

Since peripheral device 404 has three device address inputs 412, microprocessor 402 tries device address $000_2$, and increments the address (wrapping around from $111_2$ to $000_2$) until peripheral device 404 responds. The device address at which peripheral device 404 responds represents the state of data inputs 414. Thus, the present arrangement allows microprocessor 402 to read the status of data inputs 414 without any additional interface hardware.

The software executed by microprocessor 402 to communicate with peripheral device 404 is listed in the Appendix.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

APPENDIX

```
/*
        Copyright © Unpublished by
        Paragon Electronic Company
        All Rights Reserved
File name    : i2c.c
Description  : routine to communicate with the EEPROM
Input        : pointers to data and address
Output       :
Uses         :
Modifies     :
Returns      :

*/ include <Z86E30.h>
include <ram.h>

/* EEPROM I/O mapping and variables */
```

APPENDIX-continued

```c
#define SDAHI      0x05        /* set P01M to 00 000 1 01 to set data high */
#define SDALO      0x04        /* set P01M to 00 000 1 00 to set data low */
#define SCLHI      0x10        /* OR P3 with 0001 0000 to set clock high */
#define SCLLO      0xaf        /* AND P3 with 1110 1111 to set clock low */
#define DATA_MASK  0x01        /* AND P0 with 0000 0001 to read SDA */

/* P01M:
         D7  D6  D5  D4  D3  D2  D1  D0
          :   :   :   :   :   :   : ---: - P03 – P00 mode
          :   :   :   :   :   :             00 = output, 01 = input, 1X = reserved
          :   :   :   :   : --------- stack selection, 1 = internal
          :   :   : ---:---:-------------- reserved (must be 000)
          :---:------------------------- P07 – P04 mode
                                            00 = output, 01 = input, 1X = reserved
*/ void start(void)                     /* send start condition to EEPROM */
  {
  P01M = SDAHI;                      /* data high */
  P3 ;= SCLHI;                       /* clock high */
  P01M = SDALO;                      /* data low */
  P3 &= SCLLO;                       /* clock low */
  return;
  } void stop(viod)                      /* send stop condition to EEPROM */
  {
  P01M = SDALO;                      /* data low */
  P3 |= SCLHI;                       /* clock high */
  P01M = SDAHI;                      /* data high */
  P3 &= SCLLO;                       /* clock low */
  return;
  } void clock(void)                     /* give a clock pulse and read SDA */
  {
  #pragma asm "wdt"                  /* kick watchdog (int disabled) */
  P3 |= SCLHI;                       /* clock high */
  ee_temp = P0;                      /* read P0 */
  ee_temp &= DATA_MASK;              /* mask off all but SDA bit */
  P3 &= SCLLO;                       /* clock low */
  return;
  } void outbyte(void)                   /* write one byte to the EEPROM */
  {
  unsigned char count2;

for (count2 = 8; count2 > 0; count2--)
    {
    if (data1 & 0x80)                /* if bit 7 is 1 send a 1 */
        P01M = SDAHI;
    else                             /* else bit 7 is 0 so send a 0 */
        P01M = SDALO;
    #pragma asm "CALL  _clock"       /* avoids save of R0 (count2) */
    data1 - data1 << 1;              /* shift data to be sent left by 1 */
    }
  P01M = SDAHI;                      /* data line high */
  clock( );                          /* get acknowledge bit */ return;
  } void write_byte(void)
  {
  unsigned char x;

DI( );                             /* display is off during EEPROM communication */
  P2M = 0;                           /* pull all segments low (outputs) */
  P0 &= 0xfa;                        /* AND with 1111 1010 to make P0-0,2 low */ while (ram_cntr <= ram_top)        /* go until at rsm_top */
    {
    do
      {
      start( );                      /* send start */
```

APPENDIX-continued

```
            data1 = 0xa0 | address;              /* load write command + address */
            outbyte( );                          /* ee_temp > 0 if no acknowledge */
            }
        while (ee_temp > 0);

#program asm "LD __data1,__ram_cntr"    /* EEPROM byte as same as RAM byte */
        outbyte( );                              /* send address and get acknowledge */ for (x = 1; x <= 4; x++)                 /* write four data bytes */
            {
            data1 = *ram_cntr;                   /* load data to be written */
            outbyte( );                          /* send data and get acknowledge */
            ram_cntr++;                          /* increment address */
            } stop( );                                 /* stop */
        }

P01M = SDAL0;                                /* restore P0 to all outputs */
    EI( );                                       /* restore interrupts */
    return;
    } void read_byte(void)
    {
    unsigned char count1;

DI( );                                       /* display is off during EEPROM communication */
    P2M = 0;                                     /* pull all segments low (outputs) */
    P0 &= 0xfa;                                  /* AND with 1111 1010 to make P0-0,2 low */ while (ram_cntr <= ram_top)                  /* go until at ram_top */
        {
add_loop;
        start( );                                /* send start */
        data1 = 0xa0 | address;                  /* load write command + address */
        outbyte( );                              /* ee_temp > 0 id no acknowledge */
        if (ee_temp > o)                         /* if no acknowledge try next address */
            {
            address += ex02;
            if (address > 0x0a)
                address = 0;
            goto add_loop;
            } pragma asm "LD  __data1, __ram_cntr"    /* EEPROM byte is same as RAM byte */
        outbyte( );                              /* send address, get acknowledge bit */ start( );                                /* re-start */
        data1 = 0xa1 | address;                  /* prepare for a read */
        outbyte( );                              /* send command byte, get acknowledge bit */ inbyte:
        for (count1 = 8; count1 > 0; count1--)   /* read a byte */
            {
            data1 = data1 << 1;                  /* shift data1 for next bit */
            #pragma asm "CALL  __clock"          /* send clock and read SDA */
            data1 |= 0x01;                       /* assume SDA is high */
            if (ee_temp == 0)                    /* ee_temp is 0 if SDA is low */
                data1 *= 0xfe;
            }
        clock( );                                /* clock but no acknowledge */
        stop( );                                 /* stop */

*rsm_cntr = data1;                       /* store in RAM */
        ram_cntr++;                              /* increment address */
        }

P01M = SDALO;                                /* restore P0 to all outputs */
    EL( );                                       /* restore interrupts */
    return;
    }
```

What is claimed is:

1. A processing system for reading at least one data input having a meaning defined by the user which is applied to the processing system, each data input having at least two states, the processing system comprising:

a peripheral;

an address decoder coupled to the peripheral, the address decoder having an address input and at least one configuration input coupled to the at least one data input, wherein the address decoder is configured to select the peripheral based upon the address input and the configuration inputs, whereby the peripheral has a plurality of possible device addresses dependent on the state of each data input; and a processor coupled to the peripheral and to the address input of the address decoder, the processor configured to attempt communication with the peripheral by checking the plurality of possible device addresses of the peripheral until the address decoder selects the peripheral and the peripheral gives a response to the processor, wherein the device address to which the peripheral responds represents the state of each data input and the state of each data input is interpreted by the processor in accordance with the user-defined meaning of the respective data input.

2. The processing system of claim 1 wherein the peripheral has a selection input and the address decoder has a selection output coupled to the selection input of the peripheral.

3. The processing system of claim 1 wherein the peripheral and the address decoder are located on the same integrated circuit.

4. The processing system of claim 1 wherein the configuration inputs of the address decoder are on discrete pins.

5. The processing system of claim 1 wherein the states of the data inputs comprise a logic high and a logic low.

6. The processing system of claim 1 wherein the processor is a microprocessor.

7. The processing system of claim 1 wherein the processor is coupled to the address decoder and to the peripheral using an "I²C" bus.

8. The processing system of claim 1 wherein the processor is further configured to continue to attempt communication with the peripheral by repeating the check of the plurality of possible device addresses of the peripheral until the peripheral responds, thereby allowing the processor to communicate with the peripheral even if the peripheral did not respond to its device address previously.

9. The processing system of claim 1 wherein the processor is further configured to store the address to which the peripheral responds.

10. The processing system of claim 1 further comprising a timeout circuit configured to generate a timeout signal a predetermined time period after the processor attempts communication with the peripheral but receives no response from the peripheral, and wherein the processor is further configured to use the timeout signal to complete the communication attempt.

11. A processing system for reading at least one data input having a meaning defined by the user which is applied to the processing system, the processing system comprising:

a peripheral device having at least one device address input, whereby the peripheral device has a plurality of possible device addresses dependent on each device address input;

the at least one data input coupled to the at least one device address input of the peripheral device, each data input having two states whereby the device address of the peripheral device is at least partially based upon the state of each data input; and a microprocessor coupled to the peripheral device, the microprocessor configured to attempt communication with the peripheral device by checking the plurality of possible device addresses of the peripheral device until the peripheral device gives a response to the microprocessor, wherein the device address to which the peripheral device responds represents the state of each data input and the state of each data input is interpreted by the microprocessor in accordance with the user-defined meaning of the respective data input.

12. The processing system of claim 11 wherein the device address inputs of the peripheral device are on discrete pins.

13. The processing system of claim 11 wherein the data inputs are switches.

14. The processing system of claim 11 wherein the number of device address inputs to the peripheral device is greater than the number of data inputs coupled to the device address inputs.

15. The processing system of claim 11 wherein the microprocessor communicates with the peripheral device over a serial bus.

16. The processing system of claim 11 wherein the microprocessor sends a device code and a device address to the peripheral device.

17. The processing system of claim 11 wherein the microprocessor communicates with the peripheral device using an "I²C" bus.

18. The processing system of claim 11 wherein the microprocessor is further configured to continue to attempt communication with the peripheral device by repeating the check of the plurality of possible device addresses of the peripheral device until the peripheral device responds, thereby allowing the microprocessor to communicate with the peripheral device even if the peripheral device did not respond to its device address previously.

19. The processing system of claim 18 further comprising a watchdog timer coupled to the microprocessor and configured to generate a failsafe command if the microprocessor fails to update the watchdog timer within a predetermined time period from the previous update.

20. The processing system of claim 18 wherein the microprocessor is further configured to generate a diagnostic error flag if the microprocessor is unable to establish communication with the peripheral device within a predetermined period of time.

21. The processing system of claim 11 wherein the peripheral device is a memory.

22. A method for expanding the input capability of a microprocessor system to read at least one data input having a meaning defined by the user which is applied to the microprocessor system, the microprocessor system including a peripheral device having at least one device address input, the at least one data input coupled to the at least one device address input of the peripheral device, each data input having two states whereby the device address of the peripheral device is at least partially based upon the state of each data input, and a microprocessor coupled to the peripheral device, the method comprising the steps of:

(a) attempting to communicate with the peripheral device by using one possible device address of the peripheral device;

(b) repeating step (a) using different possible device addresses of the peripheral device until the peripheral device responds to the microprocessor; and (c) using the device address to which the peripheral device responds to determine the state of each data input, the state of each data input being interpreted by the microprocessor in accordance with the user-defined meaning of the respective data input.

23. The method of claim 22 wherein the method is run during initialization of the microprocessor system to determine the configuration of each data input at initialization.

24. The method of claim 22 wherein the method is run during operation of the microprocessor system to determine the configuration of each data input as the system operates.

25. The method of claim 22 wherein the microprocessor communicates using the protocol of the "I²C" bus.

26. A processing system for reading at least one data input signal having a meaning defined by the user which is applied to the processing system, each data input signal having at least two states, the processing system comprising:

a peripheral device having device address input means whereby the peripheral device has a plurality of possible device addresses dependent on the device address input;

at least one data input means coupled to the device address input means of the peripheral device, the data input means being representative of the data input signal, whereby the device address of the peripheral device is at least partially based upon the state of each data input signal; and a microprocessor coupled to the peripheral device, the microprocessor configured to attempt communication with the peripheral device by checking the plurality of possible device addresses of the peripheral device until the peripheral device gives a response to the microprocessor, wherein the device address to which the peripheral device responds represents the state of each data input signal and the state of each data input signal is interpreted by the microprocessor in accordance with the user-defined meaning of the respective data input signal.

* * * * *